United States Patent [19]
Chant

[11] 3,923,047
[45] Dec. 2, 1975

[54] JOINTS FOR ORTHOPAEDIC APPLIANCES
[75] Inventor: John Bernard Chant, Alton, England
[73] Assignee: Vessa Limited, England
[22] Filed: Nov. 18, 1974
[21] Appl. No.: 524,935

[30] Foreign Application Priority Data
Mar. 8, 1974 United Kingdom............... 10514/74

[52] U.S. Cl........................ 128/80 F; 128/88; 3/26; 403/102
[51] Int. Cl.²......................... A61F 3/00; A61F 5/00
[58] Field of Search........ 128/80 F, 80 C, 80 R, 88; 3/22, 24, 26, 2; 403/102, 110

[56] References Cited
UNITED STATES PATENTS
3,043,297    7/1962    Curnin.............................. 128/80 F

*Primary Examiner*—Ronald L. Frinks
*Attorney, Agent, or Firm*—Imirie, Smiley & Linn

[57] ABSTRACT

The invention provides an orthopaedic caliper joint of the kind lockable in the extended position by a sliding ring engaging the male portion of a three leaved joint. Novel formation of leaves of the joint and of the ring obviate the protruberance of a sharp corner of the male portion experienced during flexure of conventional joints of this kind.

3 Claims, 3 Drawing Figures

JOINTS FOR ORTHOPAEDIC APPLIANCES

BACKGROUND OF THE INVENTION

This invention concerns improvements in joints for orthopaedic appliances, especially but not exclusively for splints or calipers as worn by patients to support a weakened or deformed leg.

A well-known form of joint for such appliances comprises a two-leaved fork bracket, constituting a female member and a male member pivoted within the slot between the leaves of the female member. A parallel-sided extension of the male member comes into alignment with the sides of body of the female member when the joint is fully extended against a stop, and a ring catch slidable over the said body engages the extension of the male member to lock the joint in the "straight" position.

This known form of joint suffers the disadvantage that the extension of the male member, which has a sharp corner, protrudes beyond the leaves of the female member when the joint is flexed and constitutes a hazard to the patients skin or clothing.

SUMMARY OF THE INVENTION

According to the invention we provide an orthopaedic caliper joint comprising interpivoted male and female members wherein a flat surface formed on the periphery of the male member is located between leaves of the female member throughout pivotal movement of the joint and is engageable by a part of a ring catch slidable over an extension of the female member when the joint is fully extended.

In preferred forms of the invention the surface-engaging part of the ring catch is constituted by a key formed on the interior of the ring and the leading edge of the ring is angled and formed with an internal chamfer so as to facilitate entry of the key between the leaves of the female member. Also the key lies at a small angle relative to the opposite interior surface of the ring so as to wedge against the flat surface of the male member when the joint is fully extended.

The invention may be better comprehended by reference to the accompanying formal drawings.

DETAILED DESCRIPTION OF THE INVENTION

Figure 1:
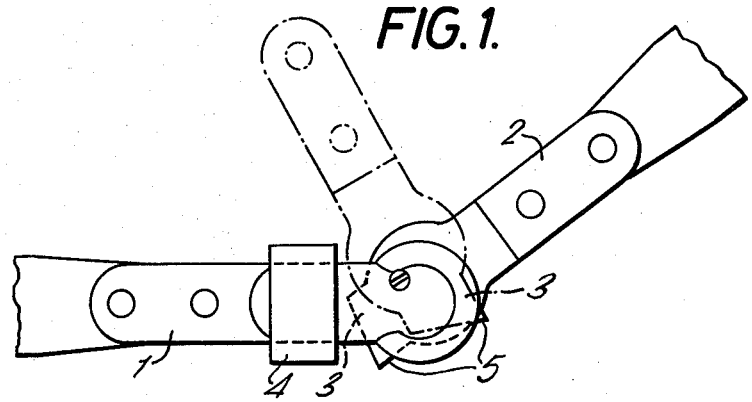
FIG. 1 is a side elevation of a conventional caliper joint in partially and fully flexed positions.
Figure 2:
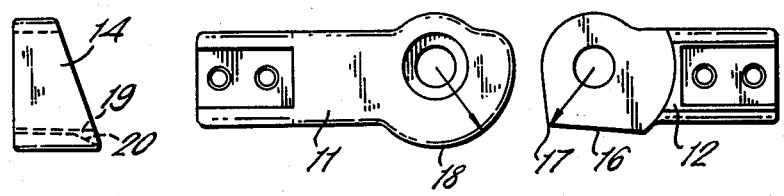
FIG. 2 is an exploded side elevation of a joint in accordance with the invention.

Referring to the drawings, FIG. 1 shows a conventional orthopaedic caliper joint, which comprises a two-leaved fork bracket 1 constituting a female member within the slotted end of which is pivoted a male member 2.

The male member 2 includes a parallel sided extension 3, which, when the joint is in the fully extended position, is engaged by a ring catch 4.

The extension 3 has a sharp corner 5, which extends beyond the periphery of the leaves of the female member 1 and constitutes a hazard to a patient and his clothing.

The joint according to the invention is likewise made up from a female member 11, male member 12 and ring catch 14.

The male member includes a flat surface 16, which terminates in a sharp corner 17, but the radius from the pivot axis to this corner is not greater than the radius from that axis to an arcuate portion 18 of the leaves of the female member and so (as can be seen from FIG. 3) it does not ever protrude beyond the periphery of those leaves.

Figure 3:
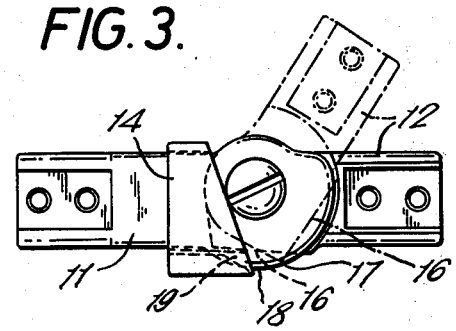
FIG. 3 is a side elevation of a joint made up from the parts of FIG. 2 in straight and partially flexed positions.

The ring catch 14 is angled at its leading edge and is formed with a key 19 and a short chamfer 20 on its interior lower surface. This key is thus enabled to pass between the leaves of the female member 11 and engage the flat surface 16 of the male member, when the joint is fully extended as can be seen in FIG. 3.

It will be understood that the invention is not restricted to the details of the preferred form which has been described by way of example which can be modified without departure from the scope of the appended claims.

I claim:

1. An orthopaedic caliper joint comprising interpivoted male and female members wherein a flat surface formed on the periphery of the male member is located between leaves of the female member throughout pivotal movement of the joint and is engageable by a key formed on the interior of a ring catch slidable over an extension of the female member when the joint is fully extended.

2. An orthopaedic caliper joint according to claim 1, wherein the leading edge of the ring is angled and formed with an internal chamfer to facilitate entry of the key between the leaves of the female member.

3. An orthopaedic caliper joint according to claim 1, wherein the key lies at a small angle relative to the opposite interior surface of the ring to ensure a wedging engagement with the flat surface of the male member, when the joint is fully extended.

* * * * *